United States Patent
Ahn et al.

(10) Patent No.: US 6,388,729 B2
(45) Date of Patent: May 14, 2002

(54) POSITION SENSING LIQUID CRYSTAL DISPLAY AND METHOD FOR FABRICATING THE SAME

(75) Inventors: Young Soo Ahn, Anyang-si; Sung Joon Bae, Sungnam-si, both of (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/855,695

(22) Filed: May 16, 2001

Related U.S. Application Data

(63) Continuation of application No. 09/183,638, filed on Oct. 30, 1998, now Pat. No. 6,285,917.

(30) Foreign Application Priority Data

Oct. 31, 1997 (KR) .......................................... 1997-57476

(51) Int. Cl.[7] ....................... G02F 1/1339; G02F 1/1355
(52) U.S. Cl. ..................... 349/190; 349/153; 349/12
(58) Field of Search ................................ 349/187, 190, 349/189, 153, 12

(56) References Cited

U.S. PATENT DOCUMENTS

| 4,250,495 A | 2/1981 | Beckernman et al. ....... 340/365 |
| 4,525,032 A | * 6/1985 | Hilsum ......................... 349/12 |
| 4,723,836 A | * 2/1988 | Kono et al. .................... 349/12 |
| 5,796,389 A | 8/1998 | Betram et al. ............... 345/173 |
| 5,995,172 A | * 11/1999 | Ikeda et al. .................... 349/12 |
| 6,064,451 A | 5/2000 | Oh et al. ....................... 349/40 |

FOREIGN PATENT DOCUMENTS

| CH | 661 990 | 8/1987 |
| EP | 0 770 971 A2 | 2/1997 |
| JP | 5-19233 | 1/1993 |
| JP | 9062443 | 3/1997 |
| KR | 1994/0011654 | 12/1994 |
| WO | WO 92/16889 | 10/1992 |

* cited by examiner

Primary Examiner—Toan Ton
(74) Attorney, Agent, or Firm—Long Aldridge & Norman LLP

(57) ABSTRACT

A position sensing liquid crystal display includes a liquid crystal display panel having a first substrate and a second substrate bonded together, and a position sensing digitizer formed as an integral unit on a first or rear surface of at least one of the substrates, whereby minimizing a display panel thickness and allowing an accurate position sensing.

7 Claims, 12 Drawing Sheets

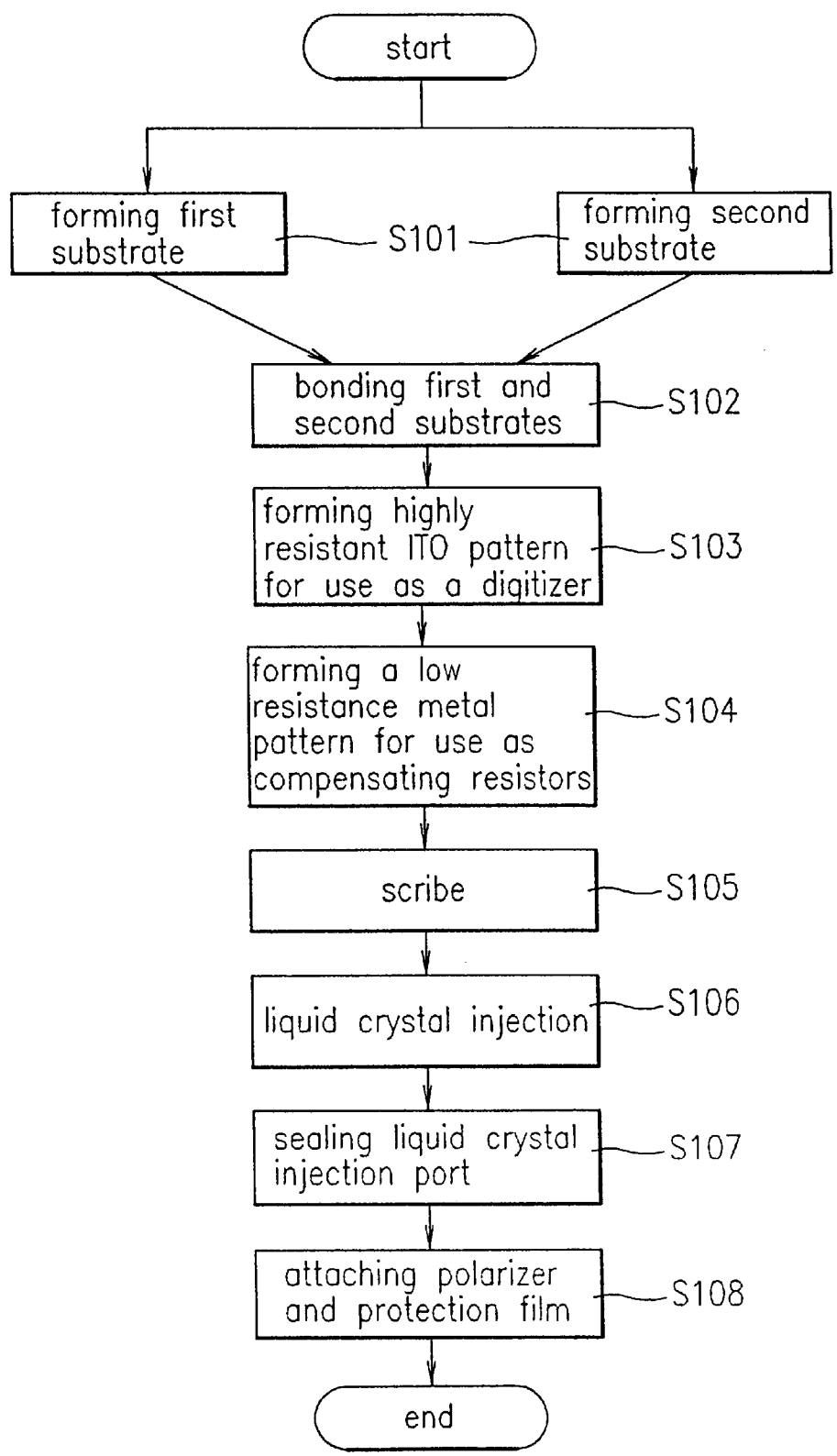

US 6,388,729 B2

POSITION SENSING LIQUID CRYSTAL DISPLAY AND METHOD FOR FABRICATING THE SAME

This application is a continuation of application Ser. No. 09/183,638 filed on Oct. 30, 1998 is now U.S. Pat. No. 6,285,917.

BACKGROUND OF THE INVENTION

1. Field of the Invention

The present invention relates to a position sensing liquid crystal display (PSLCD), and more particularly to a position sensing liquid crystal display and a method for fabricating the same, in which position sensors, such as digitizers, are formed after bonding of upper and lower plates of the liquid crystal display.

2. Discussion of the Related Art

In general, the liquid crystal display at large is provided with an upper plate, a lower plate, and a liquid crystal sealed between the upper plate and the lower plate. The upper plate has a black matrix layer, a common electrode, and color filter layers of R(red), G(green), and B(blue) for displaying colors disposed thereon. The lower plate has data lines and gate lines crossing the other to form a matrix of pixel regions, each having a thin film transistor and a pixel electrode. That is, as shown in FIG. 1, the lower plate 1 is provided with a matrix of thin film transistors, each having a gate electrode gate extended from a scan line, a source electrode S and a drain electrode extended from a data line disposed at fixed intervals. Each of the pixel regions is provided with a pixel electrode 2a having the drain electrode D of the thin film transistor 2 connected thereto. The upper plate 3 is provided with a matrix form of the black matrix layer 4 for blocking transmission of light for parts excluding the pixel electrodes 2a on the lower plate 1. There are R, G, and B color filter layers 5 between the black matrix layer 4, each for displaying a color. A common electrode 6 is formed extended to the color filter layer 5 and the black matrix layer 4. Upon selective application of driving signals to the scanning lines and the data lines from external driving circuits, the liquid crystal display displays an image. Though the aforementioned liquid crystal display has been designed only to display images according to the external driving signals, recently researches are underway in which the liquid crystal display is provided with additional position sensors for efficient use of the display in a notebook computer. That is, if a character or graphic is drawn with a stylus (an electronic pen) on the liquid crystal display equipped with the position sensors, the character or graphic is displayed as drawn.

A related art position sensing liquid crystal display will be explained with reference to the attached drawings. FIG. 2 illustrates a first example of the related art position sensing liquid crystal display.

Referring to FIG. 2, the first example of the related art position sensing liquid crystal display has a digitizer for sensing a position additionally provided outside of a general liquid crystal display independently, i.e., provided with a liquid crystal display 21 and a digitizer panel 23. There is a position sensing layer 23a (hereafter called, "digitizer"), a compensating resistor region 25 around the digitizer 23a for compensating a voltage difference, and signal applying parts 27a, 27b, 27c, and 27d at four corners of the compensating resistor region 25 for applying a position sensing signal. In the aforementioned position sensing liquid crystal display, when the signal applying parts 27a and 27b are applied at a position signal and the signal applying parts 27c and 27d are grounded, the digitizer 23a has a potential distribution from upper side to lower side thereof. When the signal applying parts 27a and 27c are applied at a position signal and the signal applying parts 27b and 27d are grounded, the digitizer 23a has a potential distribution from right side to left side thereof. Thus, when a stylus 29 is brought into contact with a point on the digitizer 23a after selective application of a position sensing signal to the signal applying parts 27a, 27b, 27c, and 27d, a present position of the stylus 29 can be sensed and determined. In the sensing of the position, a voltage of the position of the digitizer 24a at which the stylus 29 is brought into contact is used. The position sensing of even a finger tip touch can be made, which is displayed in turn on a liquid crystal display.

FIG. 3 illustrates a second example of the related art position sensing liquid crystal display. The second PSLCD has a position sensing digitizer provided inside a liquid crystal display panel. As explained in connection with FIG. 1, the second PSLCD is provided with metal, an insulating film, and a semiconductor layer on a glass for displaying an image, wherein a position sensing layer is embodied using the glass of an image data input electrical device. That is, the second PSLCD is provided with an upper plate 21a, a lower plate 21b, and a digitizer 23a between the upper plate 21a and the lower plate 21b. As explained, the upper plate 21a has the black matrix layer (not shown), a color filter layer, and an ITO layer of a common electrode formed thereon. The lower plate 21b has data lines 31, gate lines 33, and pixel electrodes (not shown), and the digitizer 23a has a compensating resistor region 25 around the digitizer and signal applying parts 27b and 27d at four corners of the compensating resistor region 25 (signal applying parts 27a and 27c are not shown).

In the second PSLCD, when the signal applying parts 27a, 27b, 27c, and 27d are applied of a position signal, the digitizer 23a exhibits a potential distribution. Accordingly, when stylus 29 is brought into contact with the display, a voltage at the contact point is sensed, thereby allowing to sense the present position. A finger tip touch on the display can be also sensed. Thus, when a stylus 29 is brought into contact with a position sensing digitizer 23a after selective application of position signal through signal applying parts 27a, 27b, 27c, and 27d, the PSLCD can sense the present position of the stylus 29 by using a capacitive coupling between the digitizer 23a and the stylus 29.

However, the aforementioned related art PSLCD has the following problems. First, the first PSLCD is cumbersome to carry because of the digitizer provided additionally on the outside of the LCD, which makes the LCD thicker and bulkier.

Second, in the case of the second PSLCD, the severe signal interference and the non-uniform potential distribution of a position sensing layer caused by capacitive coupling between the position sensing layer in the digitizer and the common electrode disposed on opposite sides of an insulating film impedes accurate position sensing and degrades the picture quality.

Third, in a case of the first conventional PSLCD, the inaccurate voltage compensation caused by the misaligned digitizer with respect to the panel causes an inaccurate position sensing.

SUMMARY OF THE INVENTION

Accordingly, the present invention is directed to a position sensing liquid crystal display and a method for fabricating the same that substantially obviates one or more of the problems due to limitations and disadvantages of the related art.

An object of the present invention is to provide a position sensing liquid crystal display and a method for fabricating the same which can sense an accurate position of the stylus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel has a first substrate having front and rear surfaces, a second substrate having front and rear surfaces, the front surface of the second substrate including a plurality of pixel electrodes and abutting against the rear surface of the first substrate, and a digitizer having intersecting grids fabricated on at least one of the front and rear surfaces of the first and second substrates.

According to one aspect of the present invention, the rear surface of the first substrate includes a black matrix layer having intersecting grids at a predetermined interval. Preferably, the digitizer is fabricated on the front surface of the first substrate, the intersecting grids of the digitizer being substantially aligned with the intersecting grids of the black matrix layer. The intersecting grids of the digitizer may be made of a conductive material, such as metal or Indium Tin Oxide. Instead of providing a digitizer separate from the black matrix, the intersecting grids of the black matrix layer may be used as the intersecting grids of the digitizer, in which the intersecting grids of the black matrix layer are fabricated with a conductive material.

In another aspect of the present invention, the digitizer may be fabricated on the rear surface of the second substrate, the intersecting grids of the digitizer being substantially aligned with the intersecting grids of the black matrix layer.

In another aspect of the present invention, input signal portions may be fabricated in the vicinity of four corners of the digitizer. The input signal portions provide a position signal, such as an input voltage, to the intersecting grids of the digitizer for detecting a stylus position. Alternatively, the input signal portions may be fabricated substantially in the middle of each side of the digitizer.

In the liquid crystal display panel with the digitizer according to the present invention, there are compensating resistors connected between the input signal portions and the intersecting grids of the digitizer. The compensating resistors formed near the input signal portions preferably have a higher resistivity than the compensating resistors formed farther away from the input signal portions to provide substantially equal potential to the intersecting grids of the digitizer. The compensating resistors include a tree shape of repetitive sequence of layers of primary interconnections between adjacent grids, secondary interconnections between adjacent primary interconnections, and tertiary interconnections between adjacent secondary interconnections.

In addition, there is at least one equipotential line connected between the input signal portions and the compensating resistors. Preferably, the equipotential line has a lower resistivity than the compensating resistors.

The PSLCD having a digitizer may be used with a controller that controls displayed images of the liquid crystal display panel. Such controller is necessary for using the PSLCD in computing devices and display devices.

The PSLCD having a digitizer may be fabricated by providing a first substrate having front and rear surfaces; providing a second substrate having front and rear surfaces, wherein the second substrate has a first display region in the front surface; forming a plurality of pixel electrodes in the first display region of the front surface of the second substrate; securing the front surface of the second substrate to the rear surface of the first substrate; and fabricating intersecting grids of the digitizer on at least one of the front and rear surfaces of the first and second substrates.

Before securing the front surface of the second substrate to the rear surface of the first substrate, it is preferable to surround the first display region with a sealing material to define a first surrounded region, and surround the first surrounded region with the sealing material. Therefore, when the first and second substrates are secured together, the sealing material surrounding the first surrounded region substantially prohibits the intrusion of any foreign substance.

In an alternative method, it is preferable to fabricate multiple display regions on one substrate. To accomplish this task, before securing the front surface of the second substrate to the rear surface of the first substrate, provide the second substrate to define a second display region having a second set of pixel electrodes; form pixel electrodes in the second display region of the second substrate; surround the first display region with a sealing material to define a first surrounded region; surround the second display region with the sealing material to define the first surrounded region; surround the first and second surrounded regions with the sealing material. When the first and second substrates are secured together, the sealing material surrounding the first and second surrounded regions substantially prohibits the intrusion of a foreign substance.

In the above processes, the intersecting grids of the digitizer are fabricated on at least one of the front and rear surfaces of the first and second substrates and in the first display region. Thereafter, the first and second substrates are scribed to separate the first display region from the second display region, each one of the first and second display regions having the digitizer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 14 illustrates a flow chart showing the steps of a method for fabricating a PSLCD according to the present invention.

DETAILED DESCRIPTION OF THE PREFERRED EMBODIMENTS

Figure 1:
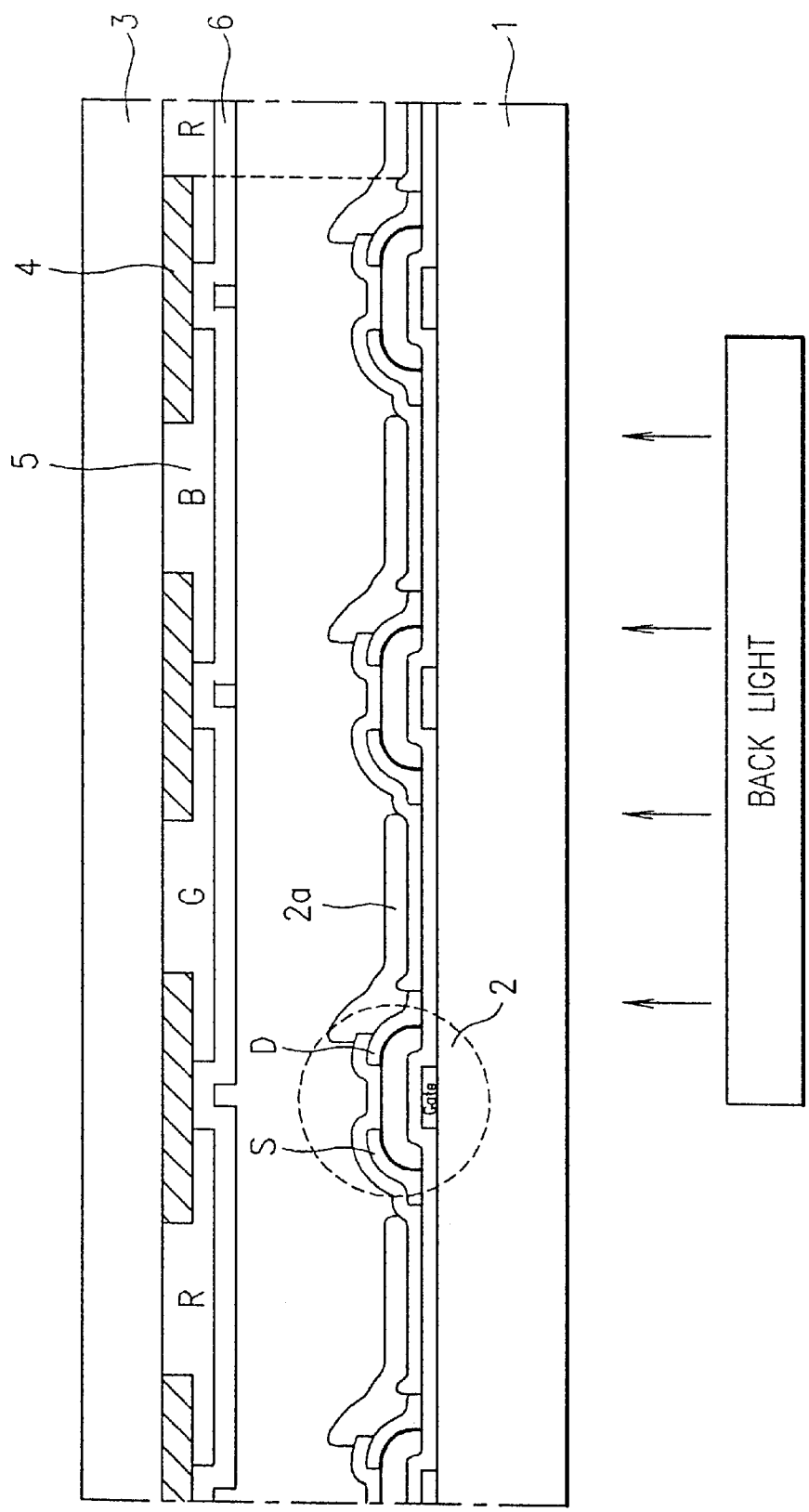
FIG. 1 illustrates a section of a liquid crystal display.
Figure 2:
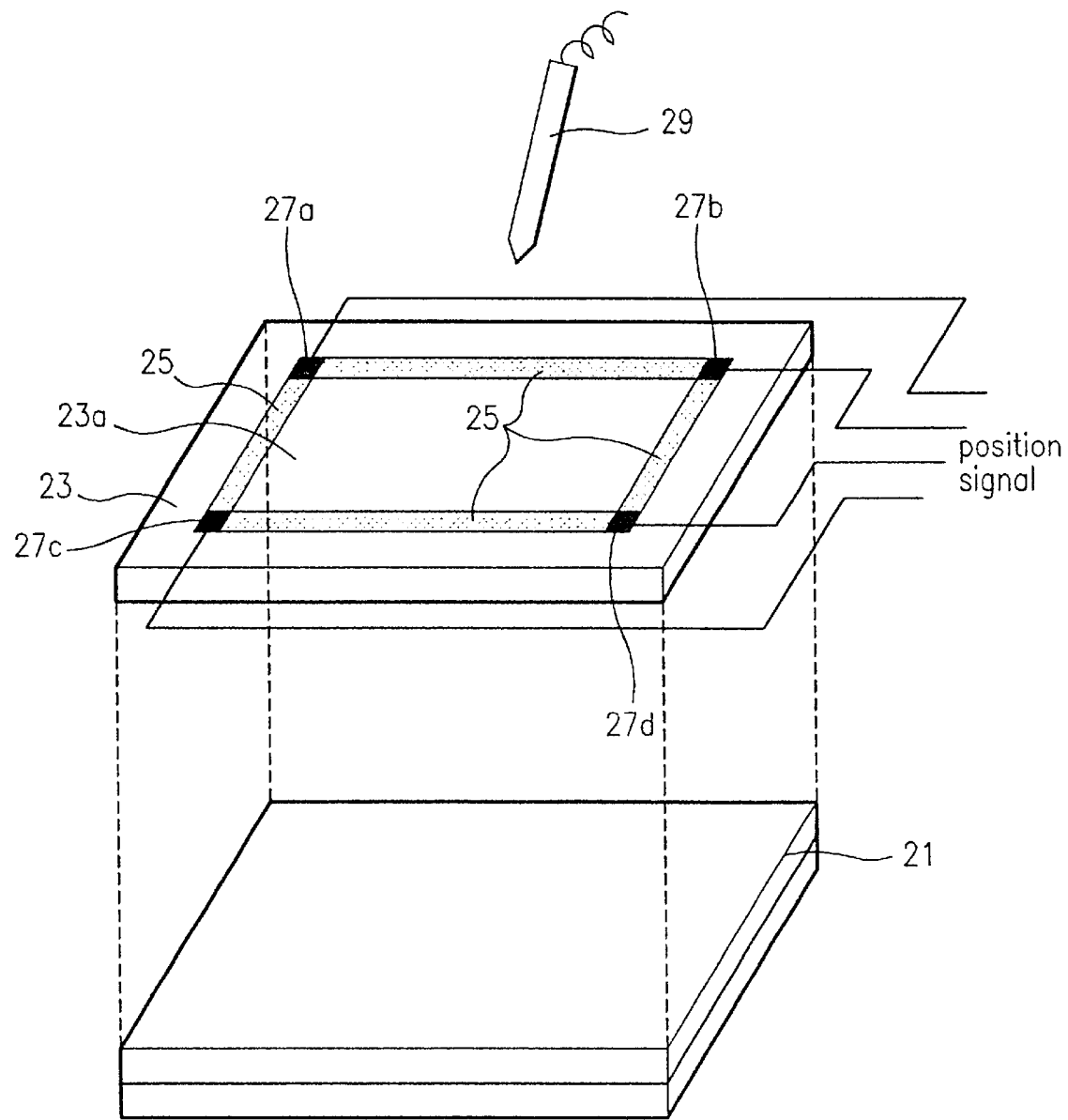
FIG. 2 illustrates a first related art position sensing liquid crystal display.
Figure 3:
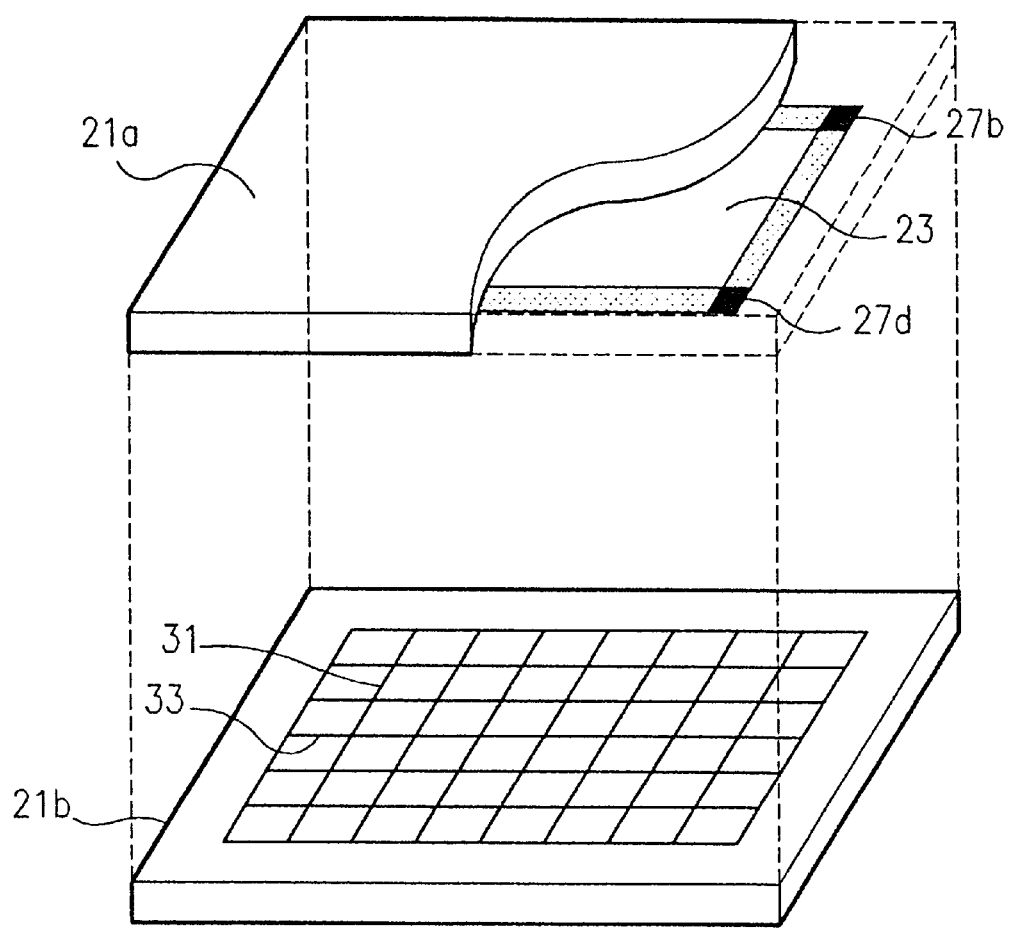
FIG. 3 illustrates a second related art position sensing liquid crystal display.
Figure 4:
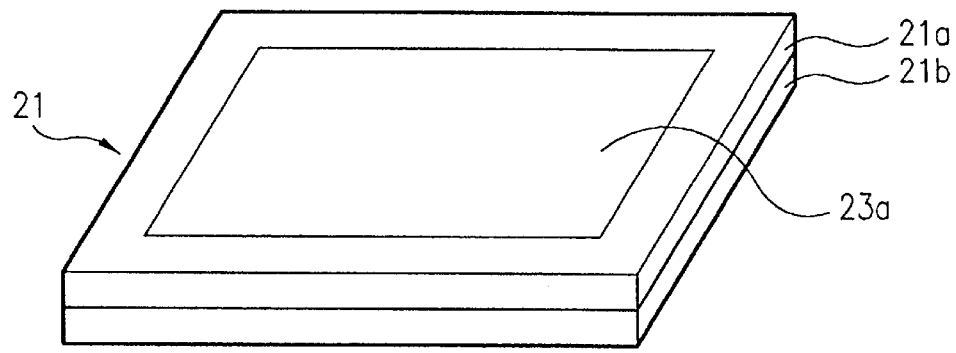
FIG. 4 illustrates a position sensing liquid crystal display in accordance with a preferred embodiment of the present invention.

Reference will now be made in detail to the preferred embodiments of the present invention, examples of which are illustrated in the accompanying drawings. In the present invention, a unitary digitizer is provided at a back side of a liquid crystal display panel. FIG. 4 illustrates a system of a position sensing liquid crystal display in accordance with a preferred embodiment of the present invention.

Referring to FIG. 4, the position sensing liquid crystal display in accordance with a preferred embodiment of the present invention includes a liquid crystal display panel 21 having a first substrate 21a (hereinafter called, "an upper plate") and a second substrate 21b (hereinafter called, "a lower plate") bonded together, and a digitizer 23a formed on a back surface of the first substrate 21a.

Figure 5:
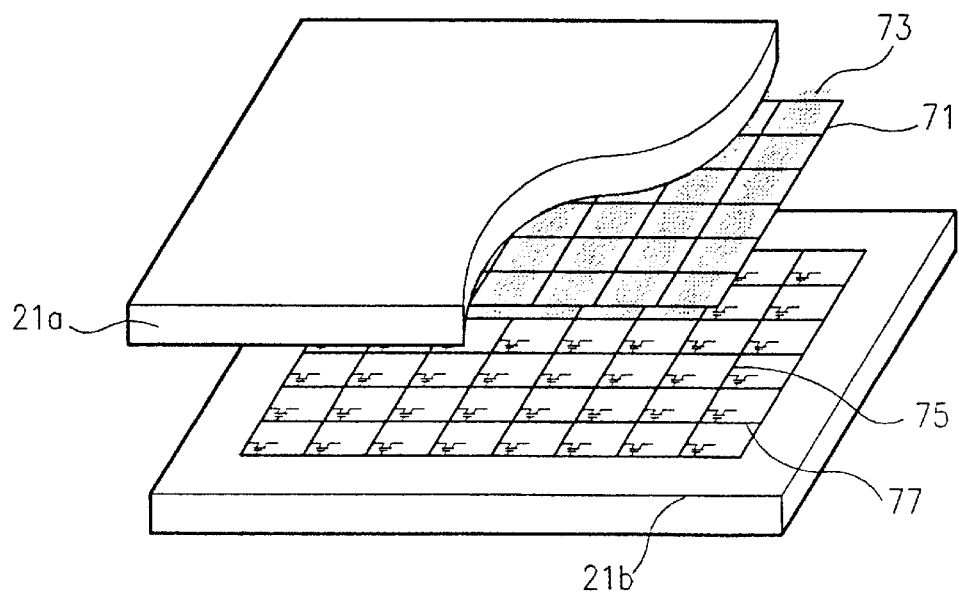
FIG. 5 illustrates a plan view of a liquid crystal display.

Referring to FIG. 5, in the position sensing liquid crystal display in accordance with a preferred embodiment of the present invention, a plurality of black matrix patterns 71 is preferably formed on the first substrate 21a, and color filter layers 73 (shaded portion) are formed between the black matrix layer patterns 71 for displaying colors. Then an overcoat layer (not shown) is formed on an entire surface inclusive of the color filter layer 73. An ITO layer (not shown) for use as a common electrode is formed on the overcoat layer.

A matrix of data lines 75 and gate lines 77 are formed on the second substrate 21b. A thin film transistor (TFT) is formed at every crossing of the data lines 75 and the gate lines 77. After formation of required patterns on the first substrate 21a and the second substrate 21b, respectively, the first substrate 21a and the second substrate 21b are bonded with a sealing material. That is, for a simplification of a fabrication process, patterns for a plurality of displays are concurrently formed on a sheet of glass substrate, and the completed glass substrate is cut into display regions, which are bonded with the sealing material according to the following process.

Figure 6:
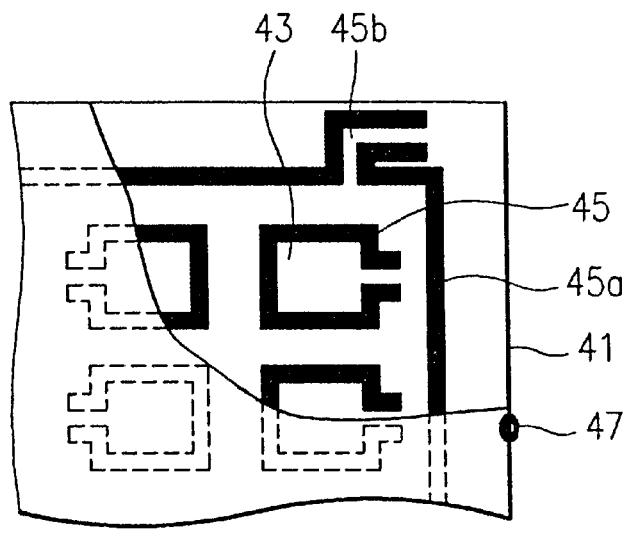
FIG. 6 illustrates a partial cut away view of glass substrates having a sealing material bonded thereto.

FIG. 6 illustrates a partial cut away view of the first glass substrate and the second glass substrate bonded with a sealing material. In FIG. 6, there are multiple LCD panels formed on the substrate, each panel individually surrounded by a sealing material. Referring to FIG. 6, the sealing material 45 is applied around each liquid crystal sealing region of a display region in one pair of glass substrates 41, each having an area enough to fabricate a plurality of liquid crystal displays. A peripheral sealing material 45a having an opening 45b is applied to surround all the display regions or panels. The opening 45b is formed having a length sufficient enough to prevent permeation of etchant used during a digitizer formation process and to prevent compression of air between the pair of glass substrate 41 during bonding process. Then each display region is separated. The pair of glass substrates 41 is sufficiently large to fabricate a plurality of liquid crystal display panels. Each display panel separated from the large glass substrates 41 is injected with liquid crystal into the liquid injection region 43 through a liquid injection port 47 provided at a portion of the sealing material 45, the liquid crystal injection port 47 is sealed, and a polarization plate is bonded at the back of each display, to complete a liquid crystal display.

Figure 7:
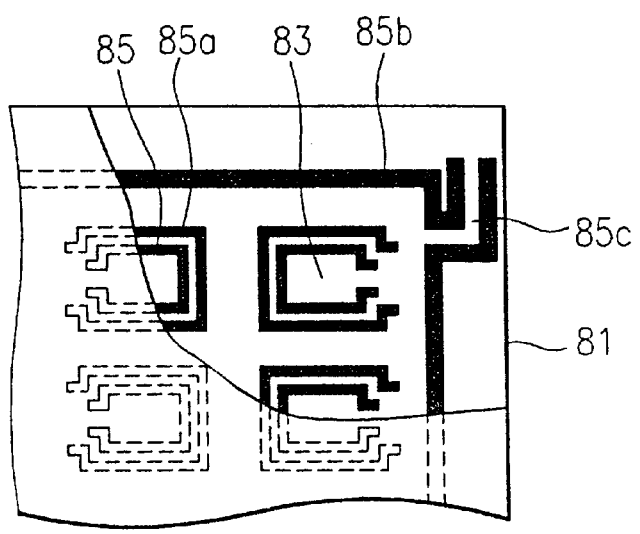
FIG. 7 illustrates a partial cut away view of another glass substrate having a sealing material bonded thereto.

FIG. 7 illustrates a partial cut away view of glass substrates of the present invention having an alternative display panel configuration and having a sealing material applied thereto. Referring to FIG. 7, the sealing material 85 is applied around each liquid crystal injection region 83 of display regions defined on a glass substrate 81 for the first time. Then sealing material 85a is applied for the second time at an outer periphery of the sealing material 85, spatially spaced from the sealing material 85. The sealing material is applied twice around the display region, for prevention of unwanted etching of pads (PAD) of the display by etchant used during a digitizer formation process which follows. That is, the sealing material is applied twice around the display region, to protect the pads against etching solution when display regions are separated. The an outer sealing material 85b having an opening 85c is applied to surround all the display regions. The opening 85c is formed having a length sufficient enough to prevent permeation of etchant used during a digitizer formation process and to prevent compression of air between the first and second glass substrates 21a and 21b during bonding process. After applying the sealing materials twice around each display region and bonding the first substrate 21a and the second substrate 21b, a digitizer 23a is formed on a back side of at least one of the substrates 21a and 21b.

Figure 8:
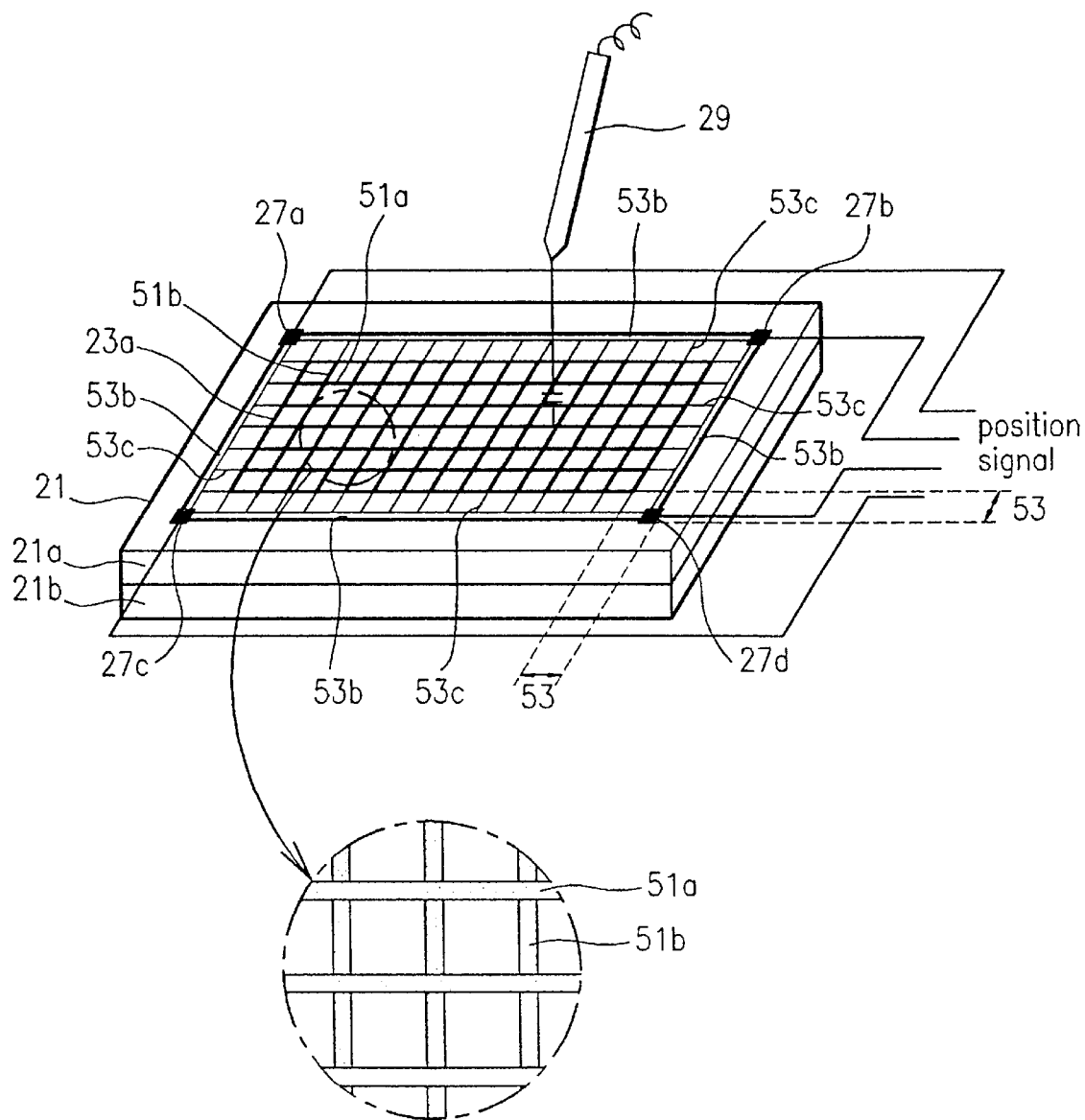
FIG. 8 illustrates a perspective view of a position sensing liquid crystal display in accordance with a first embodiment of the present invention.

The aforementioned PSLCD of the present invention will be explained in more detail. FIG. 8 illustrates a plan view of a position sensing liquid crystal display in accordance with a first embodiment of the present invention. Referring to FIG. 8, the PSLCD in accordance with a first embodiment of the present invention includes a liquid crystal panel 21 having a first substrate 21a and a second substrate 21b bonded together, a digitizer 23a having X-axis grids 51a and Y-axis grids 51b at a back surface of the substrate 21a, and signal applying parts 27a, 27b, 27c, and 27d at four corners of the liquid crystal display panel 21 for applying a position signal to the X-axis grids 51a and the Y-axis grids 51b. The digitizer 23a is directly patterned on the back surface of the first substrate 21a of ITO or metal which has a high resistance. If the X-axis grids 51a and the Y-axis grids 51b are formed of a metal, the metal is patterned such that the X-axis grids 51a and the Y-axis grids 51b are aligned or matched with the black matrix pattern (see FIG. 5) formed on the first substrate 21a, for obtaining a high aperture.

In order to make the black matrix pattern and the metal pattern, the same alignment key used in formation of the black matrix pattern on the first substrate 21a is used in metal patterning. Alternatively, if the X-axis grids 51a and Y-axis grids 51b are formed of ITO, which is transparent, the X-axis grids 51a, Y-axis grids 51b and the black matrix pattern 71 may not need to be matched. The X-axis grids 51a and the Y-axis grids 51b form a matrix with either an insulating layer or direct contact between the X-axis grids 51a and the Y-axis grids 51b.

There is a compensating resistor region 53 between the signal applying parts 27a, 27b, 27c, and 27d and the digitizer 23a for transferring the position signal from the signal applying parts 27a, 27b, 27c, and 27d to the X-axis grids 51a and the Y-axis grids 51b. The compensating resistor region 53 includes equipotential maintaining resistors 53b and equipotential compensating resistors 53c. The equipotential maintaining resistors 53b transmit the position signal provided through the signal applying parts 27a, 27b, 27c, and 27d to the equipotential compensating resistors 53c, and the equipotential compensating resistors 53c compensate voltages such that the position signal received from the equipotential maintaining resistors 53b has an equal potential on entire surfaces of the X-axis and Y-axis grids.

In the aforementioned first embodiment of the present invention, a position can be sensed using a stylus after application of a position signal through the signal applying parts 27a, 27b, 27c, and 27d preferably at four corners of the liquid crystal display panel 21. In this instance, a position of a stylus, or a finger tip, can be sensed. First, position sensing in a case of a stylus touch will be explained.

Referring to FIG. 8, the position signal provided through the signal applying parts 27a, 27b, 27c, and 27d is applied to the X-axis grids 51a and the Y-axis grids 51b through the compensating resistor region 53 having the equipotential maintaining resistors 53b and the equipotential compensating resistors 53c. When the stylus 29 is brought into contact at an arbitrary spot of the digitizer 23a, a capacitive coupling is formed between the stylus 29 and a pertinent grid. Upon measuring and calculating the capacitive coupling, the position of the stylus 29 can be detected. If not a stylus touch, but a finger tip touch, is to be detected, a position signal is applied the same as above, and a leakage current flowing through a capacitive coupling between the finger tip, which is a virtual ground, and a pertinent grid is measured in each of the signal applying parts and calculated again, to sense the position of the finger tip.

Figure 9:
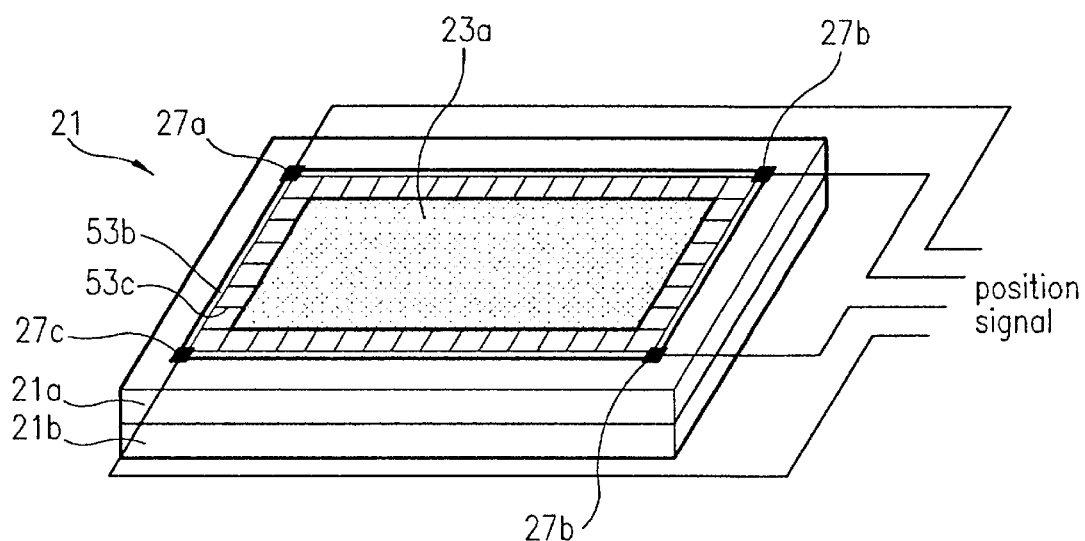
FIG. 9 illustrates a perspective view of a position sensing liquid crystal display in accordance with a second embodiment of the present invention.

FIG. 9 illustrates a plan view of a position sensing liquid crystal display in accordance with a second embodiment of the present invention. In the second embodiment, the position sensing digitizer 23a is not separately patterned in the X-axis and Y-axis grids, but formed as an integral unit.

Referring to FIG. 9, the position sensing liquid crystal display in accordance with the second embodiment of the present invention includes a liquid crystal display panel 21 having a first substrate 21a and a second substrate 21b attached together, a position sensing digitizer 23a on a back surface of the substrate 21a of the liquid crystal display panel 21 formed as an integral unit with the liquid crystal display panel 21, and signal applying parts 27a, 27b, 27c, and 27d in the near vicinity of four corners of the liquid crystal display panel 21 for applying a signal to the digitizer 23a. There are equipotential maintaining resistors 53b and equipotential compensating resistors 53c provided between the signal applying parts 27a, 27b, 27c, and 27d and the digitizer 23a.

Preferably, the digitizer 23a is formed of an ITO layer, which is transparent. Accordingly, when a position signal is selectively applied to the signal applying parts 27a, 27b, 27c, and 27d, the stylus makes contact with a point on the digitizer 23a and a capacitive coupling between the stylus and the digitizer 23a is calculated, and thus a position of the stylus on the digitizer 23a can be measured.

Figure 10:
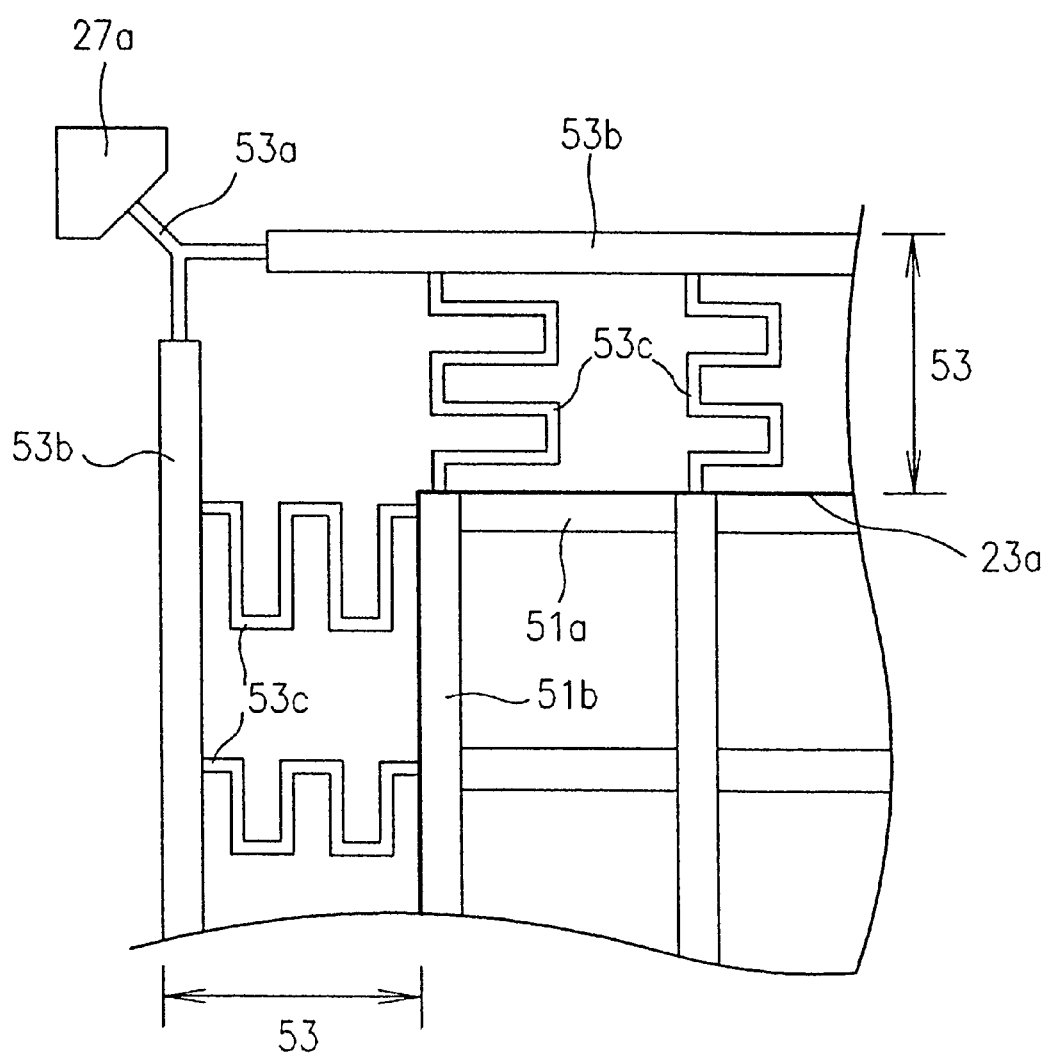
FIG. 10 illustrates a compensating resistor region used in the present invention.

FIG. 10 illustrates a partial plan view of a PSLCD in accordance with the first and second embodiments of the present invention. Referring to FIG. 10, the PSLCD in accordance with the first and second embodiments of the present invention includes a signal applying part 27a for applying a voltage, a digitizer 23a having a plurality of X-axis grids 51a and Y-axis grids 51b, and compensating resistor regions 53 for providing equal potential from the signal applying part 27a to the X-axis and Y-axis grids 51a and 51b in the digitizer 23a by regulating the potential with resistors. The compensating resistor region 53 has node resistors 53a, equipotential maintaining resistors 53b, and equipotential compensating resistors 53c. The equipotential maintaining resistors 53b are formed at four sides of the digitizer 23a, and the equipotential compensating resistors 53c are connected between the equipotential maintaining resistors 53b and the X-axis and Y-axis grids 51a and 51b in the digitizer 23a.

The node resistor 53a transmits a position sensing signal provided from the signal applying part 27a to the equipotential maintaining resistors 53b. The equipotential compensating resistors 53c compensate voltages such that the nearest and farthest X-axis, and Y-axis grids 51a and 51b from the signal applying part 27a are at an equal potential. To accomplish this effect, the equipotential compensating resistors 53c are patterned to have different lengths as shown in FIG. 10. The position sensing signal passes through the signal applying part 27a, the node resistor 53a, the equipotential maintaining resistor 53, and the equipotential compensating resistor 53c, and finally applied to the X-axis and Y-axis grids 51a and 51b. A longer equilibrium compensating resistor provides a greater voltage drop between two points.

Figure 11:
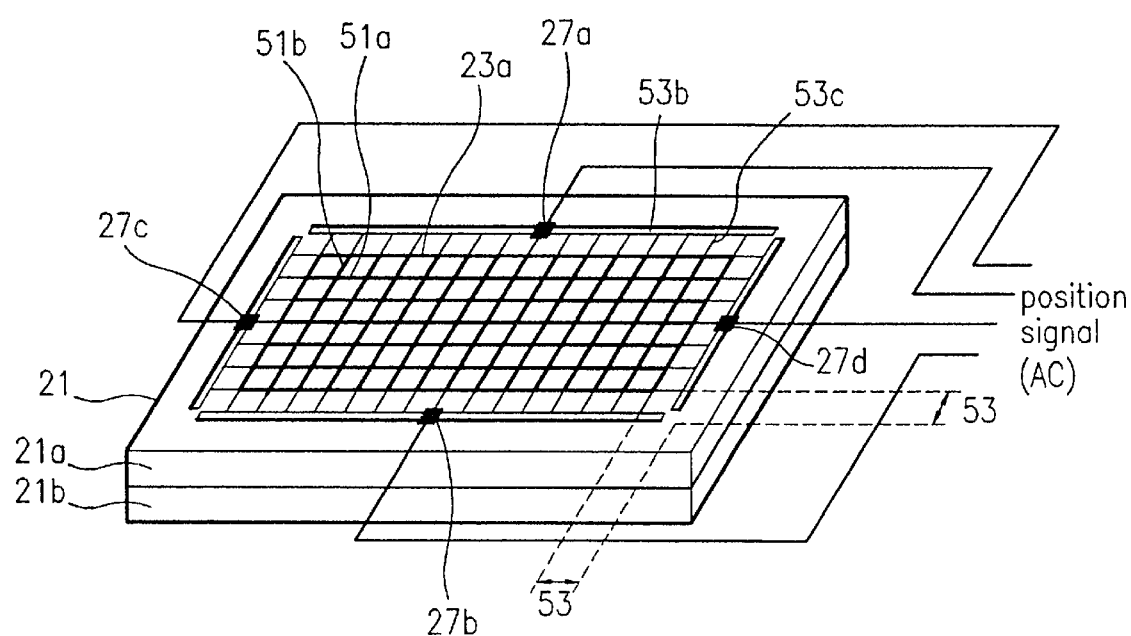
FIG. 11 illustrates a perspective view of a position sensing liquid crystal display in accordance with a third embodiment of the present invention.

FIG. 11 illustrates a perspective view of a position sensing liquid crystal display in accordance with a third embodiment of the present invention. In the third embodiment, the signal applying parts 27a, 27b, 27c, and 27d for applying a position signal for detecting a position are disposed substantially in the middle of each side of the digitizer 23a.

Referring to FIG. 11, the PSLCD in accordance with the third embodiment of the present invention includes a liquid crystal display panel 21 having a first substrate 21a affixed to a second substrate 21b, a digitizer 23a having X-axis and Y-axis grids 51a and 51b on a back surface of the substrate 21a, and signal applying parts 27a, 27b, 27c, and 27d at middle of sides of the liquid crystal display panel 21 for applying a position signal to the X-axis and Y-axis grids 51a and 51b. The X-axis and Y-axis grids 51a and 51b are preferably formed of ITO or metal.

Moreover, there is a compensating resistor region 53 between the signal applying parts 27a, 27b, 27c, and 27d and the X-axis and Y-axis grids 51a and 51b. The compensating resistor region 53 includes equipotential maintaining resistors 53b and equipotential compensating resistors 53c. The equipotential maintaining resistors 53b transmit the position signal provided through the signal applying parts 27a, 27b, 27c, and 27d to the equipotential compensating resistors 53c, and the equipotential compensating resistors 53c compensate voltages such that the position signal received from the equipotential maintaining resistors 53b has an equal potential on entire surfaces of the X-axis and Y-axis grids. In the third embodiment of the present invention, the signal applying parts 27a, 27b, 27c, and 27d are positioned preferably in the middle of the four sides of the digitizer 23a to minimize the separation distance from the signal applying parts 27a, 27b, 27c, and 27d to the nearest and the farthest grids (X-axis and Y-axis grids).

Figure 12:
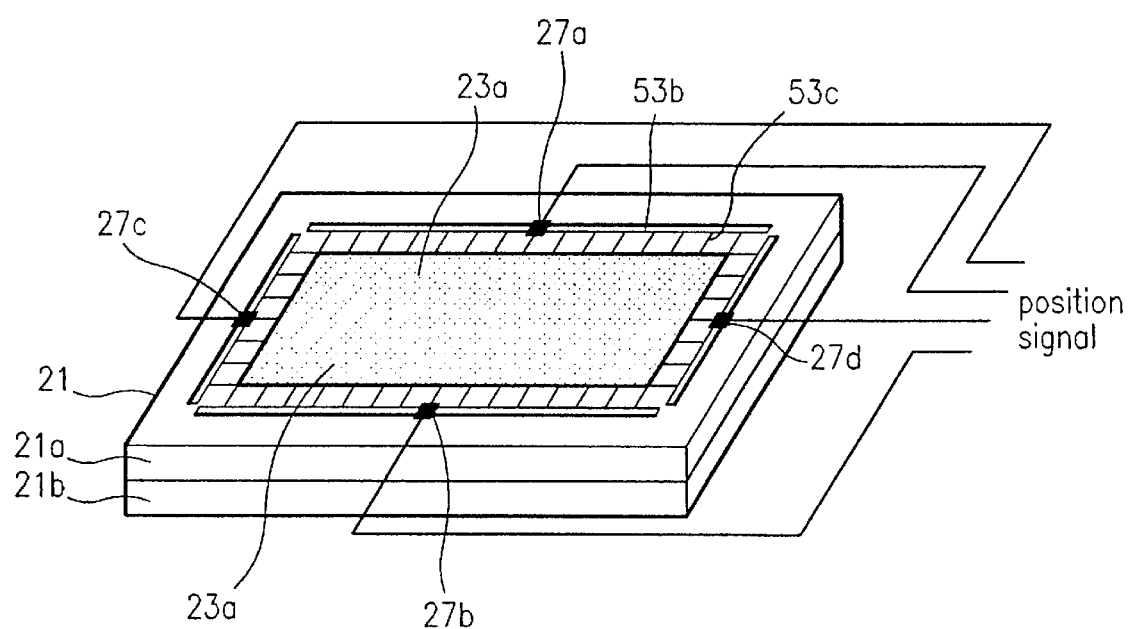
FIG. 12 illustrates a plan view of a position sensing liquid crystal display in accordance with a fourth embodiment of the present invention.

FIG. 12 illustrates a perspective view of a position sensing liquid crystal display in accordance with a fourth embodiment of the present invention. Referring to FIG. 12, the PSLCD includes a liquid crystal display panel 21 having a first substrate 21a and a second substrate 21b bonded together, a digitizer 23a on a back surface of at least one of the substrates 21a and 21b, and signal applying parts 27a, 27b, 27c, and 27d in the middle of the sides of the liquid crystal display panel 21. The digitizer 23a is preferably formed as an integral part of at least one of the substrates 21a and 21b as opposed to a separate unit. There is a compensating resistor region between the signal applying parts 27a, 27b, 27c, and 27d and the digitizer 23a for compensating voltages such that the position signal provided from the signal applying parts 27a, 27b, 27c, and 27d is substantially at an equal potential all over the digitizer 23a. The operation of the fourth embodiment PSLCD of the present invention is omitted as the operation is the same with the first embodiment of the present invention.

Figure 13:
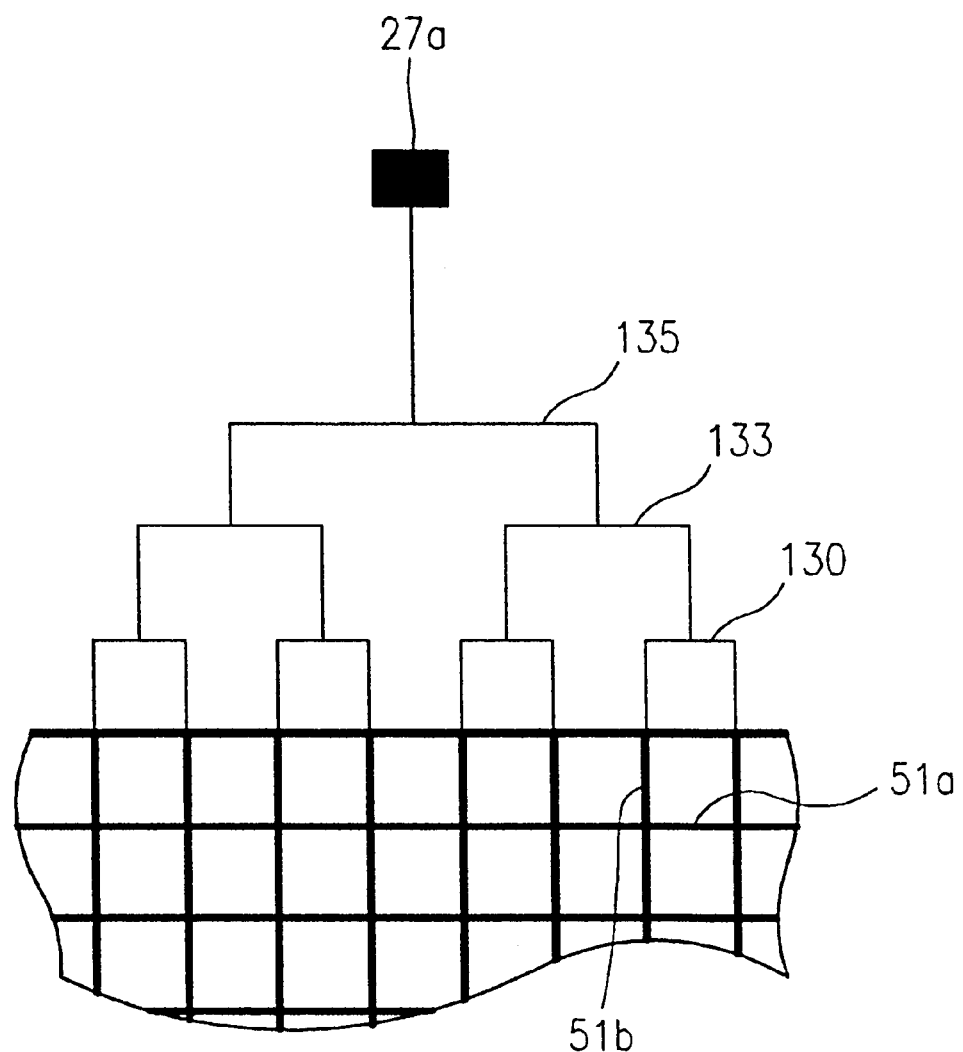
FIG. 13 illustrates another embodiment of the compensating resistor region used in the present invention.

FIG. 13 illustrates an alternative embodiment of the compensating resistor region in the third and fourth embodiments of the present invention. Referring to FIG. 13, another embodiment of the compensating resistor region includes a tree shape of repetitive sequence of layers of primary interconnections 130 between adjacent grids(Y-axis or X-axis grids), secondary interconnections 133 between adjacent primary interconnections 130, and tertiary interconnections 135 between adjacent secondary interconnections 133. According to this, lengths of the equipotential compensating resistors 130, 133, and 135 can be patterned the same all over the regions of the digitizer so that the position signal provided through the signal applying part 27a (27b, 27c, and 27d are not shown) is linearly equipotential. The X-axis grids 51a and the Y-axis grids 51b in the digitizer 23a form a matrix with either an insulating layer or with direct contact between the X-axis grids 51a and the Y-axis grids 51b. Thus, by forming the equipotential compensating resistors in the hierarchical or tree shape with repetitive sequential layers of primary, secondary, tertiary, interconnections, lengths of passes of a position signal applied from the signal applying part 27a to respective grids can be patterned the same, hence achieving substantially the same potential in X-axis and Y-axis grids.

A method for fabricating a PSLCD of the present invention will be explained with reference to the flow chart shown in FIG. 14. Referring to FIG. 14, the method for fabricating a PSLCD of the present invention starts with forming a first and a second substrate (S101) and bonding the first and second substrates together (S102). Then a highly resistant ITO (or metal) pattern is formed on a back surface of at least one of the first and second substrates, for use as a digitizer (S103). A low resistance metal pattern is formed around the highly resistant pattern for use as compensating resistors (S104). The joined first and second substrates are scribed (S105). Liquid crystal is then injected through a liquid injection port (S106), and then the liquid injection port is sealed (S107). A polarizer and a protection films are attached (S108) to complete a fabrication process of a PSLCD.

For reference, the present invention is applicable to displays in which two substrates are bonded together, such as TFT, IPS mode LCD, STN mode LCD, and the like.

As described above, the PSLCD and the method for fabricating the same of the present invention have the following advantages. First, because the digitizer is directly formed on one of the upper or lower plates, a separate digitizer glass is dispensed with, thus minimizing thickness and weight of a PSLCD.

Second, the formation of the digitizer grid pattern using the same alignment key used in patterning the upper and lower plates allows an exact alignment of patterns of the substrate and the digitizer, thus improving an aperture ratio and dispensing with the requirement for a position correction due to a misalignment.

Third, the formation of a digitizer on a back surface of either the upper or lower plate in place of the inside of the LCD panel, which provides greater spaces between various layers in the LCD panel and the digitizer and minimizes parasitic capacitances between the various layers and the digitizer, allows an accurate position sensing.

Fourth, the digitizer can be formed adaptive to a size of the LCD panel.

Fifth, the shorter distance from the finger tip to the position sensing digitizer can improve a position sensing sensitivity because a magnitude of a signal flowing through the finger, a virtual ground, becomes greater when a fixed magnitude of a position sensing signal is applied.

Sixth, the formation of the compensating resistors which compensates an equipotential of the digitizer in tree-shaped repetitive layers allows an accurate sensing of a position as an accurate equipotential can be provided from the signal applying part to the grids of the digitizer.

Seventh, the patterning of the digitizer on the front surface of the first substrate or the rear surface of the second substrate after bonding the first and second substrates prevents damage of the black matrix layer formed on the rear surface of the first or upper substrate.

Eighth, the double application of sealing material around the liquid crystal injection region and display region in separation of every display region can protect pads of the display exposed outside of the display region.

It will be apparent to those skilled in the art that various modifications and variations can be made in the position sensing liquid crystal display and method for fabricating the same of the present invention without departing from the spirit or scope of the invention. Thus, it is intended that the present invention covers the modifications and variations of this invention provided they come within the scope of the appended claims and their equivalents.

What is claimed is:

1. A method for fabricating a liquid crystal display device, comprising:

providing a first substrate having front and back surfaces;

providing a second substrate having front and back surfaces;

bonding the first substrate to the second substrate so that the front surfaces of the first and second substrates face each other with a gap therebetween and such that a sealing material defines at least two regions within the gap that are surrounded by peripheral sealing material;

forming a conductive layer on the back surface of the first substrate after bonding the first substrate to the second substrate;

injecting a liquid crystal into the gap after forming the conductive layer on the back surfaces of the first substrate; and scribing the substrates after bonding to separate the two regions from each other.

2. The method of claim 1, wherein the conductive layer includes a transparent conductive layer.

3. The method of claim 2, wherein the transparent conductive layer includes Indium Tin Oxide.

4. The method of claim 1, wherein a color filter layer is formed on the front surface of the first substrate.

5. The method of claim 1, wherein a plurality of thin film transistors are formed on the front surface of the second substrate.

6. The method of claim 1, the method further comprising scribing the substrates after bonding to separate the two regions from each other.

7. The method of claim 6, wherein the liquid crystal is injected through the opening after scribing the substrates.

* * * * *